(12) United States Patent
Zhang et al.

(10) Patent No.: US 6,704,372 B2
(45) Date of Patent: Mar. 9, 2004

(54) DIGITAL IMPLEMENTATION OF MULTI-CHANNEL DEMODULATORS

(75) Inventors: Weimin Zhang, San Jose, CA (US); Tim Misko, Cupertino, CA (US); Jeremy Woodburn, Mountain View, CA (US)

(73) Assignee: Broadlogic Network Technologies Inc., San Jose, CA (US)

( * ) Notice: Subject to any disclaimer, the term of this patent is extended or adjusted under 35 U.S.C. 154(b) by 197 days.

(21) Appl. No.: 09/956,479

(22) Filed: Sep. 18, 2001

(65) Prior Publication Data

US 2003/0056221 A1 Mar. 20, 2003

(51) Int. Cl.[7] .......................... H04L 27/06; H04L 27/02
(52) U.S. Cl. ...................................... 375/316; 375/347
(58) Field of Search ................................ 375/260, 316, 375/259, 347; 455/132–140; 370/210, 344

(56) References Cited

U.S. PATENT DOCUMENTS

| | | |
|---|---|---|
| 5,299,192 A | 3/1994 | Guo et al. |
| 5,504,783 A | 4/1996 | Tomisato et al. |
| 5,699,363 A * | 12/1997 | Wishart et al. ............. 370/497 |
| 6,014,366 A | 1/2000 | Ichiyoshi |
| 6,263,195 B1 | 7/2001 | Niu et al. |

FOREIGN PATENT DOCUMENTS

EP          000296175 B1 * 12/1988      ........... H04L/27/02

* cited by examiner

Primary Examiner—Tesfaldet Bocure
(74) Attorney, Agent, or Firm—Townsend and Townsend and Crew, LLP (57) ABSTRACT

A method and circuitry for implementing digital multi-channel demodulation circuits. More particularly, embodiments of the present invention provide a digital multi-channel demodulator circuit. The demodulator includes a frequency-block down-converter that receives a multi-channel analog RF signal and shifts the multi-channel analog RF signal to a lower frequency band. An ADC receives the multi-channel analog RF signal from the frequency-block down-converter and converts the multi-channel analog RF signal to a multi-channel digital RF signal. A digital channel demultiplexer receives the multi-channel digital RF signal from the ADC and demultiplexes the multi-channel digital RF signal into separate digital RF channels.

33 Claims, 8 Drawing Sheets

DIGITAL IMPLEMENTATION OF MULTI-CHANNEL DEMODULATORS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates generally to broadband communications, and more particularly to a method and circuitry for implementing demodulator circuits.

There is a growing acceptance of video services, such as video on demand, and an anticipated deployment of home servers. As a result, broadband appliance manufacturers have an increasing need to support multiple simultaneous channels of digital content delivered over the cable system. This need includes other systems such as satellite and terrestrial TV systems. The ability to simultaneously demodulate potentially all of the channels viewed by a particular home can fundamentally change the viewing paradigm for video content from one that is driven by network schedules to one that is driven by consumers independent of networks.

Figure 1:
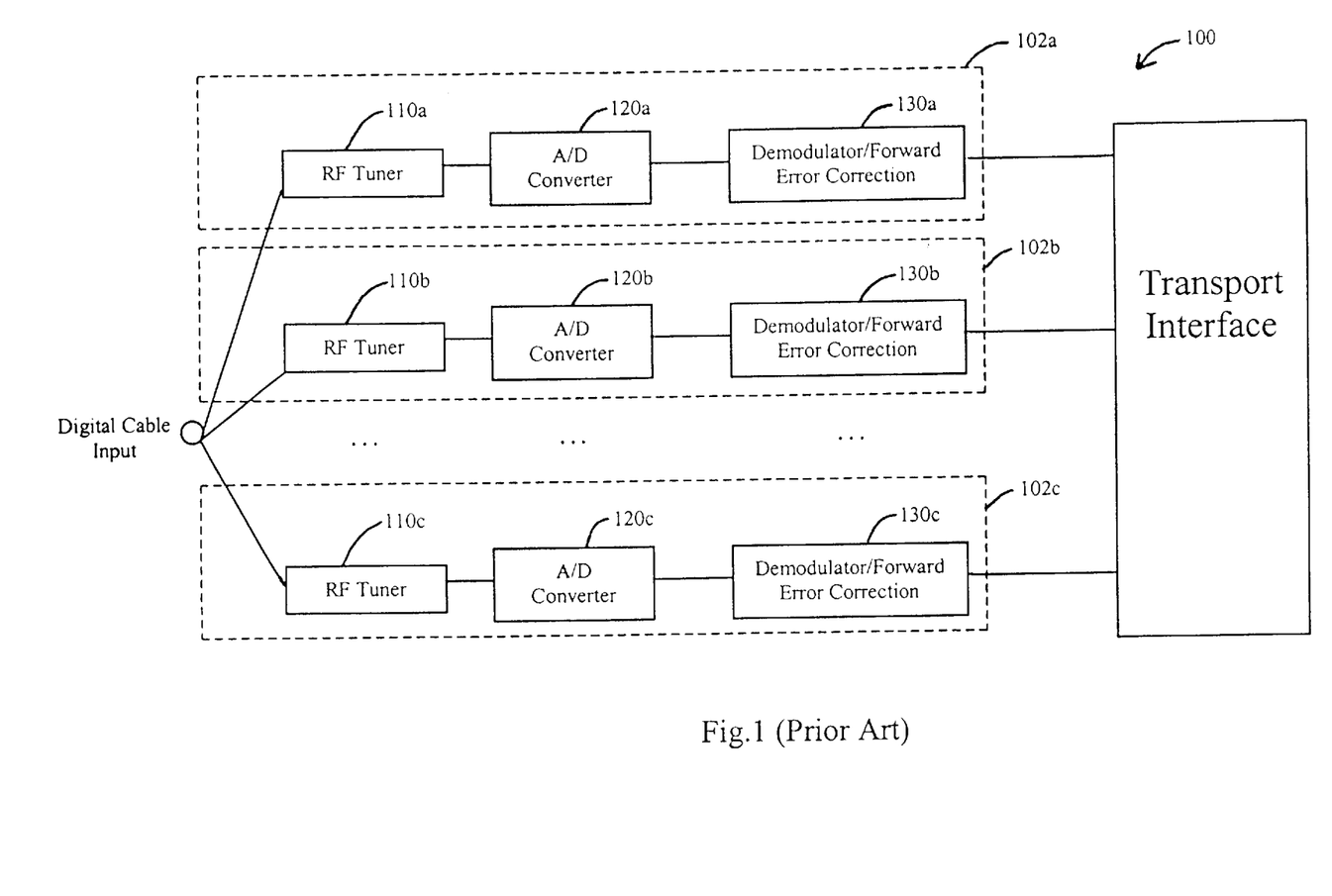
FIG. 1 is a simplified high-level block diagram of a traditional multi-channel cable and satellite demodulator that is used in cable and satellite systems.

FIG. 1 is a simplified high-level block diagram of a traditional multi-channel cable and satellite demodulator 100 of a type that is used in cable and satellite systems. A multi-channel RF input signal typically includes a plurality of RF channels, each characterized by a different carrier frequency and being modulated in accordance with desired information to be carried on that channel. Each channel's bandwidth is less than the spacing of the carrier frequencies. For example, carrier frequencies in the UHF band (300 MHz to 3 GHz) may be spaced at 6 MHz intervals. Included are receiver chains 102a, 102b, and 102c. Each chain includes a tuner 110, an analog-to-digital converter (ADC) 120 and a digital demodulator 130. Digital demodulator 130 includes a forward error correction (FEC) circuit (not explicitly shown).

The function of each tuner 110 is to select an RF channel falling within a specific frequency band. There is one tuner for each RF channel. The input RF signal for a tuner contains many or all RF channels. Each tuner then converts the frequency of its selected RF channel to a lower fixed frequency pass band for cable systems, or to baseband for satellite systems. Each ADC 120 then digitizes the selected RF signal. Then each digital demodulator 130 performs signal demodulation and outputs recovered digital bits with error indication signals.

Each RF channel requires one analog tuner and analog band-pass or low-pass filters. The problem with this approach is that the cost, power consumption, and complexity go up as the required number of RF channels goes up.

BRIEF SUMMARY OF THE INVENTION

The present invention provides a method and circuitry for demodulating signals such as downstream signals. At least some embodiments are characterized by lower cost, lower power consumption, and/or lower complexity.

A digital multi-channel demodulator circuit according to an embodiment of the invention includes a frequency-block down-converter that receives a multi-channel analog RF signal and shifts the multi-channel analog RF signal to a lower frequency band. An ADC receives the multi-channel analog RF signal from the frequency-block down-converter and converts the multi-channel analog RF signal to a multi-channel digital RF signal. A digital channel demultiplexer receives the multi-channel digital RF signal from the ADC and demultiplexes the multi-channel digital RF signal into separate digital RF channels.

Other embodiments include a digital selector that receives the separate RF channels and selects one or more RF channels, and a plurality of demodulators that receive one or more of the RF channels from the digital selector and demodulate one or more of the RF channels.

Other embodiments include a digital tuner for use in multi-channel demodulation. The digital tuner includes a numeric control oscillator (NCO) that generates a select frequency, the select frequency being associated with a corresponding and separate RF channel. A complex multiplier receives the multi-channel digital RF signal and multiplies the multi-channel digital RF signal with the select frequency and passes the result through a low-pass filter LPF to extract the signal that is superimposed on the corresponding RF channel.

Other embodiments include a polyphase channel demultiplexer for use in multi-channel demodulation. The polyphase channel demultiplexer includes at least one low-pass filter (LPF) configured to receive the multi-channel digital RF signal and to synchronize the RF channels. Also included is a discrete Fourier transform circuit (DFT) that demultiplexes the multi-channel digital RF signal into separate digital RF channels.

Embodiments of the present invention achieve their purposes and benefits in the context of known circuit and process technology and known techniques in the electronic and process arts. Further understanding, however, of the nature, features, and advantages of the present invention is realized by reference to the latter portions of the specification, accompanying drawings, and appended claims.

DETAILED DESCRIPTION OF THE INVENTION

Figure 2:
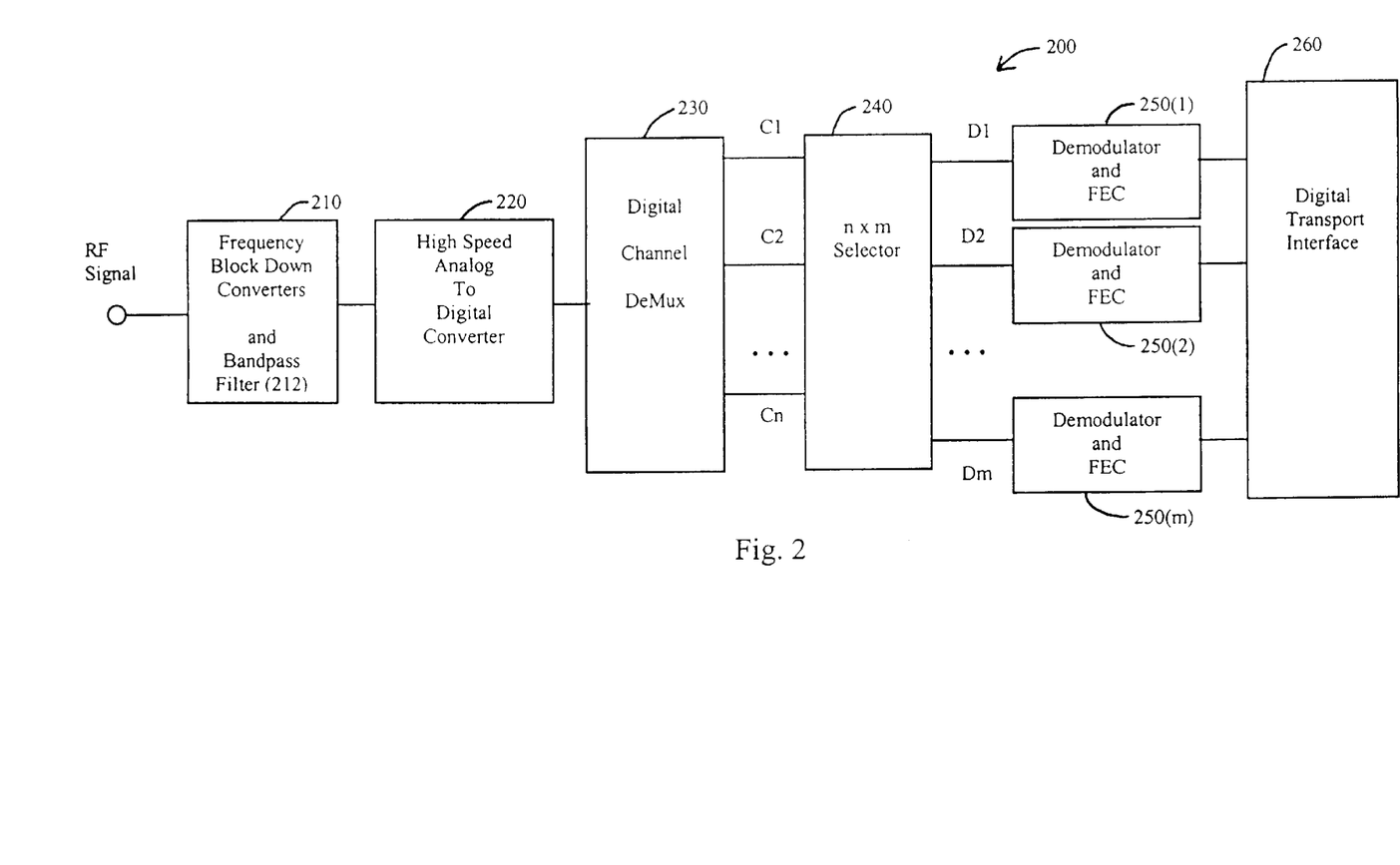
FIG. 2 is a simplified high-level block diagram of an exemplary multi-channel demodulator, according to an embodiment of the present invention.

FIG. 2 is a simplified high-level block diagram of an exemplary multi-channel demodulator 200 according to an embodiment of the present invention. A frequency-block down-converter 210 receives one or more multi-channel analog RF signals which can be sourced by a variety of systems such as satellite systems, terrestrial TV systems, cable systems, etc.

For the purposes of this description, a multi-channel RF signal is an RF signal in a given frequency band that carries multiple RF channels. The frequencies of the incoming RF signal can vary from very low frequencies to tremendously high frequencies. Moreover, in the context of this description, an RF channel is characterized by a carrier signal that falls within the frequency band. A given RF channel carries one or more "content" channels, which are data streams that are superimposed on that channel's carrier frequency and intended to be accessed or used by subscribers. As used here, one RF channel can carry one or more content channels. Accordingly, one RF channel can provide a variety of data streams, some of which are selected by a subscriber, e.g., audio, video, etc. Other data streams might be pre-programmed or selected by a program provider, e.g., conditional access data, etc.

Down converter 210 shifts the multi-channel analog RF signal to a lower frequency band. The frequencies are simply downshifted, i.e., the frequency band of each RF channel and the guard bands remain the same relative to each other, but all are translated down by the same frequency. More specifically, the multi-channel analog RF signal is multiplied by a reference signal to a lower frequency band. Signal components outside the lower frequency band are then filtered out. The frequencies are lowered so that subsequent stages can better process the signal. For example, in some specific embodiments, the frequencies are shifted to a band below 300 MHz, so that they can be processed by a pair of 300 MHz analog-to-digital converters (ADC), or by a single 600 MHz ADC. For cable systems, a single ADC is typically used. For satellite systems, while a single ADC can be used, at least two ADCs are typically used because of more rigid requirements, e.g., synchronization is more difficult due to the higher frequencies.

In this specific embodiment, a bandpass filter 212, which is a part of down converter 210, reduces aliasing from unwanted channels. Because demodulator 200 requires only one single-stage frequency-block down-converter, instead of many RF tuners as in the prior art, the cost of the overall system is reduced.

An ADC 220 then converts the down-converted multi-channel analog RF signal to a multi-channel digital RF signal. In this specific embodiment, ADC 220 is a high-speed ADC so that an entire signal band with n channels can be converted.

A digital channel demultiplexer 230 then demultiplexes the multi-channel digital RF signal into separate digital RF channels $C_1$ to $C_n$. The specific implementation of channel demultiplexer 230 will depend on the specific application and requirements. Alternative channel demultiplexer embodiments are described in more detail below (FIGS. 2 and 3). Still referring to FIG. 2, an n×m digital selector 240 receives the demultiplexed digital RF channels $C_1$ to $C_n$ and then selects one or more of the RF channels $D_1$ to $D_m$ from one or more of the digital RF channels $C_1$ to $C_n$. RF channels $C_1$ to $C_n$ contain content channels that are selected or used by a subscriber. Channel-search capabilities of the digital selector 240 renders it much faster than traditional analog channel switching through RF tuners. This is because only the selected channels are later demodulated unlike the systems using RF tuners which demodulate all of the RF channels. Embodiments of the present invention are not only faster but they dissipate less heat because fewer resources are required when demodulating only the selected RF channels.

The m selected RF channels are then fed into respective demodulators 250(1), 250(2), . . . 250(m). The architecture of demodulator 200 enables it to handle multi-channel satellite, terrestrial TV (NTSC, ATSC, DVB-T, etc), and cable downstream signals. In some embodiments demodulators 250(1 . . . m) are shared demodulators because they share resources. Many functional blocks can be shared between different demodulators. Such functional blocks, for example, can include numeric controlled oscillators (NCOs), timing error detection circuitry, carrier recover circuitry, etc. Because of the resource sharing between such demodulators, significant power saving is achieved. Hence, with such embodiments of the present invention, more RF channels can be demodulated in a single chip. In this specific embodiment, demodulators 250(1 . . . m) demodulate only the RF channels that are selected by digital selector 240. In other embodiments, other content channels can be demodulated and which specific content channels that are demodulated will depend on the specific application. After being demodulated, the selected RF channels $D_1$ to $D_m$ then feed into a digital transport interface 260.

Figure 3:
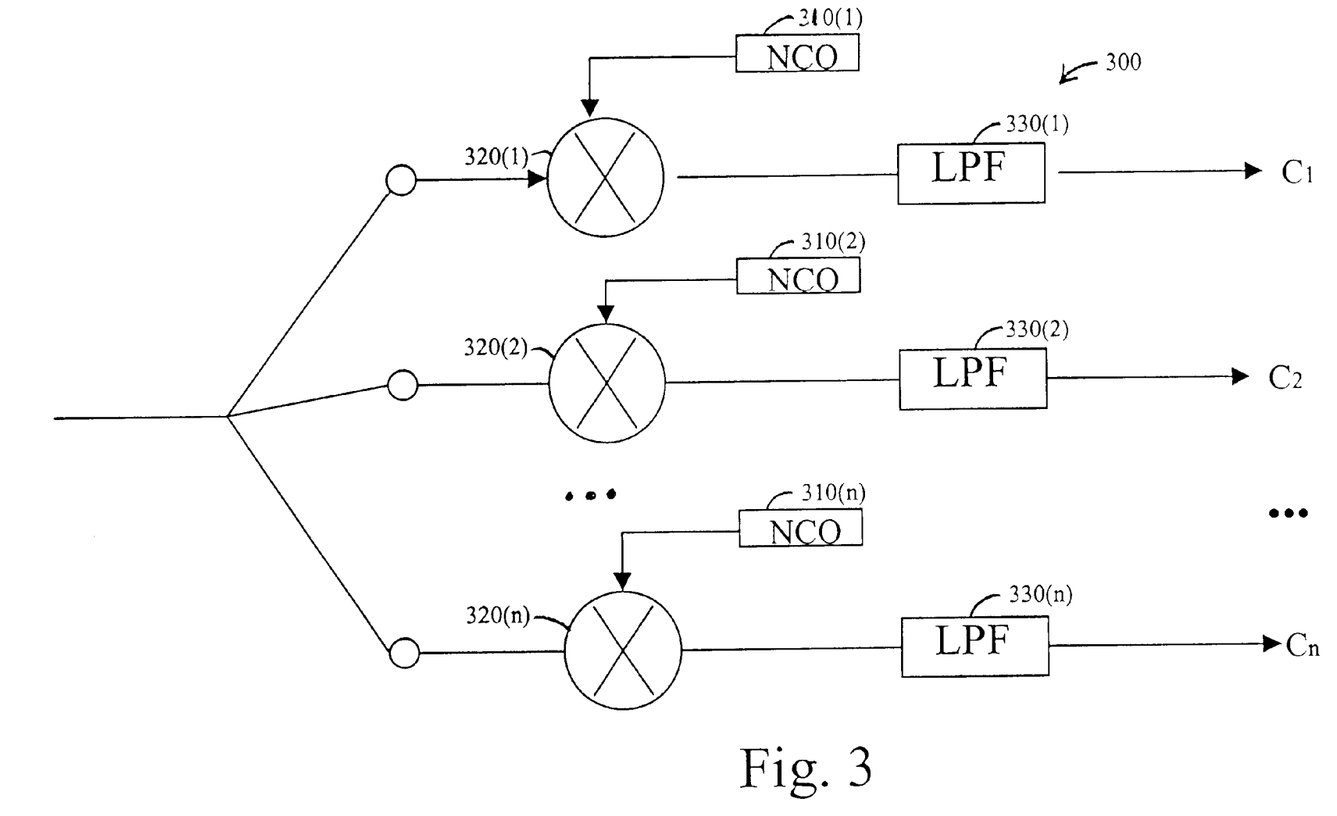
FIG. 3 is a simplified high-level schematic diagram of a digital tuner, according to an embodiment of the present invention.

FIG. 3 is a simplified high-level schematic diagram of a digital tuner 300, which in some embodiments of the present invention, can be used to implement digital channel demultiplexer 230 of FIG. 2. Digital tuner 300 includes a bank of n numeric control oscillators (NCOs) 310(1 . . . n), complex multipliers 320(1 . . . n), and low-pass filters (LPFs) 330(1 . . . n). One chain of each of these elements is used for each RF channel. The exact number of these elements will depend on the number of RF channels to be demultiplexed. In this specific embodiment, low-pass filters 330 are high-speed finite impulse response (FIR) filters.

In operation, digital tuner 300 receives the RF channels from an ADC, such as ADC 220 of FIG. 2, and then separates the RF channels $C_1$ to $C_n$, which are in the digital domain. The same multi-channel RF signal from the ADC enters each multiplier, each RF channel having a unique frequency. Because all chains of FIG. 3 operate in a similar way, only one chain of digital tuner 300 will be described for ease of illustration.

Numeric oscillator 310(1) generates a frequency, or "target" frequency, that matches the characteristic frequency of a desired RF channel, or "target" RF channel. The output of NCO 310(1) is multiplied by all the RF channels received at complex multiplier 320(1). When an multi-channel RF signal is multiplied with the output of NCO 310(1), the frequency of target RF channel signal is shifted to a desired channel. In some embodiments of the present invention, the target RF channel is shifted to a baseband, i.e., centered at DC. LPFs 330(1 . . . n) receive all RF channels and each filters out all RF channels except for its target RF channel. Thus, only the target RF channel passes. Accordingly, separate RF channels exit digital tuner 300, i.e., the multi-channel RF signal is demultiplexed. Digital tuner circuit 300 then outputs the separated RF channels $C_1$ to $C_n$, each RF channel being centered at baseband.

Figure 4:
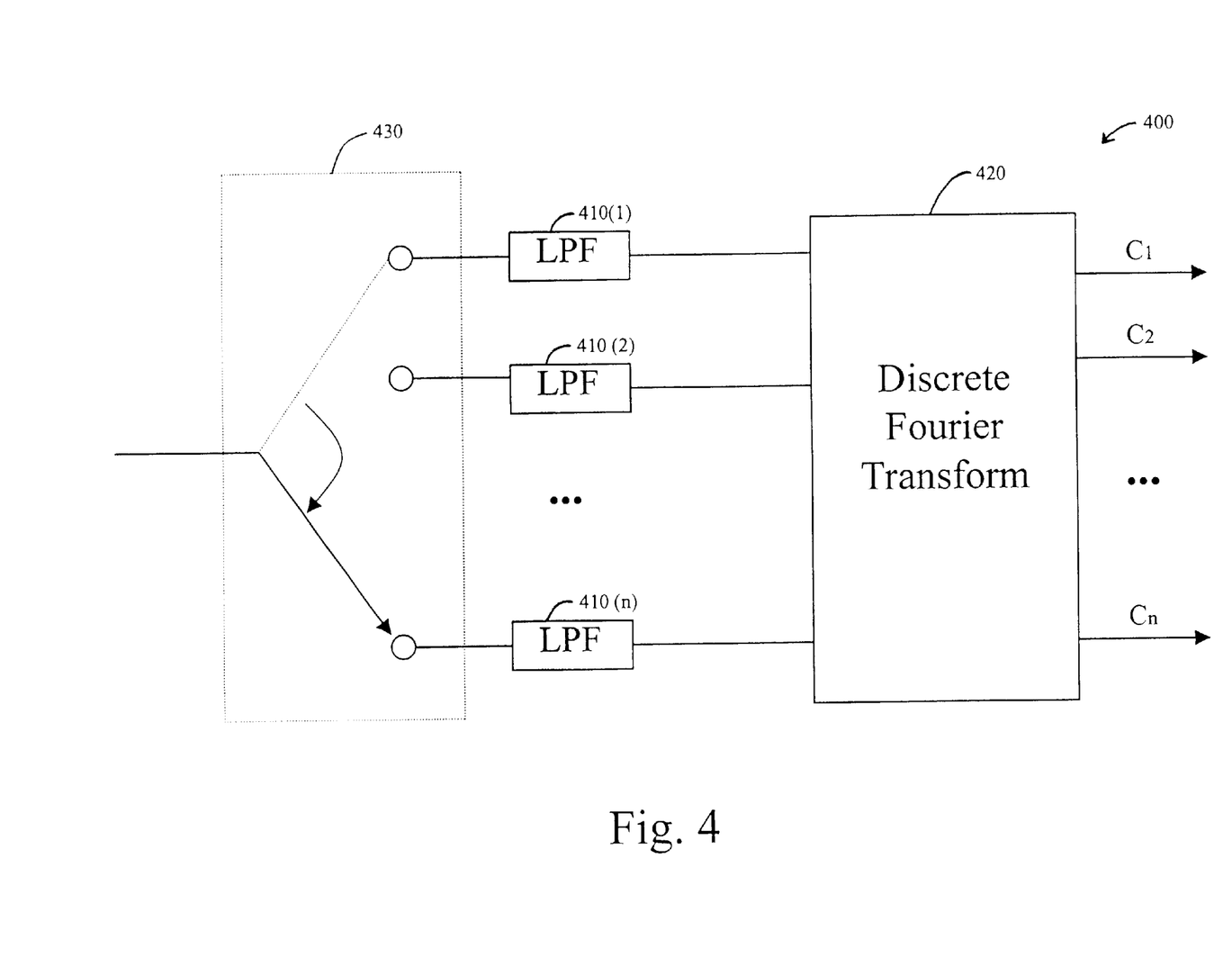
FIG. 4 is a simplified high-level schematic diagram of a polyphase channel demultiplexer, according to an embodiment of the present invention.

FIG. 4 is a simplified high-level schematic diagram of a polyphase channel demultiplexer 400, which in some embodiments of the present invention, can be used to implement digital channel demultiplexer 230 of FIG. 2. Polyphase channel demultiplexer 400 includes a bank of low-pass filters (LPFs) 410(1 . . . n) and a discrete Fourier transform circuit (DFT) 420. One LPF is used for each channel, and the exact number of LPFs will thus depend on the number of RF channels to be demultiplexed. In this specific embodiment, low-pass filters 410 are low-speed finite impulse response (FIR) filters. With a polyphase structure, only low-speed FIR filters are required, because the coefficients of each filter are a part of a bigger low-pass filter.

In operation, polyphase channel demux 400 receives the multi-channel RF signal from an ADC, such as ADC 220 of FIG. 2, and then separates the RF channels $C_1$ to $C_n$, which are in the digital domain. The same multi-channel RF signal from the ADC enters each LPF via a down-sample circuit 430. More specifically, the multi-channel RF signal is down sampled at down-sample circuit 430, i.e., sampled in the time domain so that the multi-channel RF signal passes through LPFs 410(1 . . . n). The multi-channel RF signal passing through LPFs 410(1 . . . n) contains the same information except that in each occurrence, it is phase shifted and time shifted. LPFs 410(1 . . . n) synchronize the RF channels in the time domain such that they differ only in phase.

DFT 420 separates the RF channels from the original RF carrier signal. In some specific embodiments, DFT 420 can be implemented as a combination of different sized fast Fourier transforms (FFTs). The function of DFT 420 is analogous to that of NCOs 310(1 . . . n) of FIG. 3. While digital tuner 300 of FIG. 3 associates each RF channel with a unique frequency, polyphase channel demultiplexer 400 associates each RF channel with a unique phase.

Accordingly, separate RF channels exit polyphase demux 400, i.e., multi-channel RF signal is demultiplexed. Polyphase demux 400 then outputs the separated RF channels $C_1$ to $C_n$, each RF channel being centered at baseband.

Because the polyphase filter scheme of FIG. 4 does not require NCOs or complex multipliers, it requires less real estate on a chip. Moreover, it reduces power consumption of polyphase demux 400 because there are fewer elements.

Figure 5:
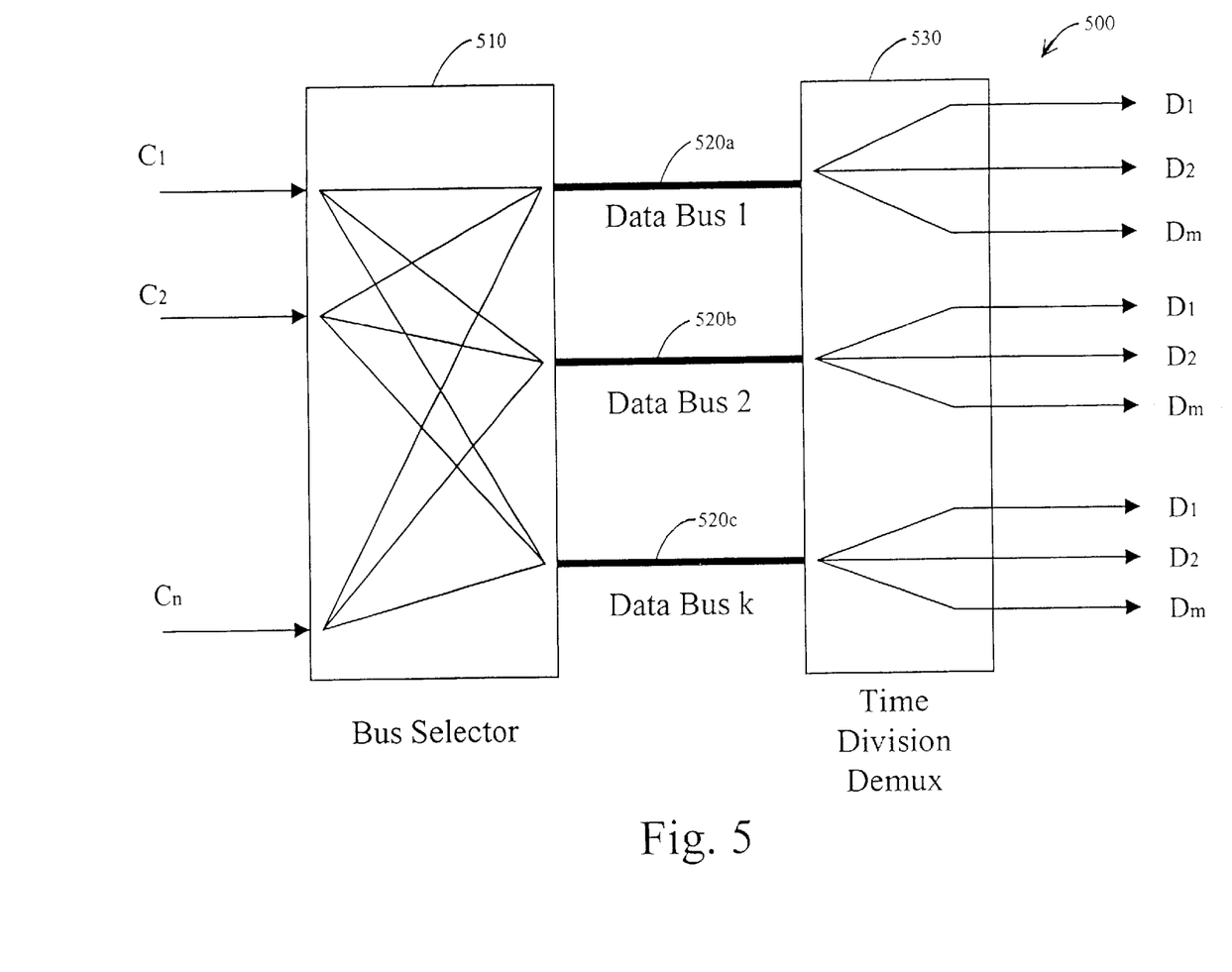
FIG. 5 is a simplified high-level schematic diagram of a M×N digital selector, according to an embodiment of the present invention.

FIG. 5 is a simplified high-level schematic diagram of an nxm digital selector 500, which in some embodiments of the present invention, can be used to implement digital selector 240 of FIG. 2. Digital selector 500 includes a bus selector 510, one or more multiple data buses 520, and a time division demultiplexer 530.

In operation, digital selector 500 digitally selects one or more RF channels $D_1$ to $D_m$ from the digital RF channels $C_1$ to $C_n$ and then sends them to appropriate demodulators or output ports (not shown) through different data buses (not shown). Because a bus clock is much faster than the channel-sampling rate, each bus can be used by multiple RF channels with the use of time division multiplexing which occurs before the selected RF channels enter the data buses. Hence, each data bus provides data to multiple demodulators and each output RF signal from a channel demultiplexer (not shown) can be selected to use any data bus.

Other variations, modifications, and alternatives to these specific embodiments are possible. For example, as stated above, each separate RF channel has one or more content channels. Some of these RF channels are selected for demodulation. The specific RF channels selected for demodulation will depend on the specific application.

Figure 6:
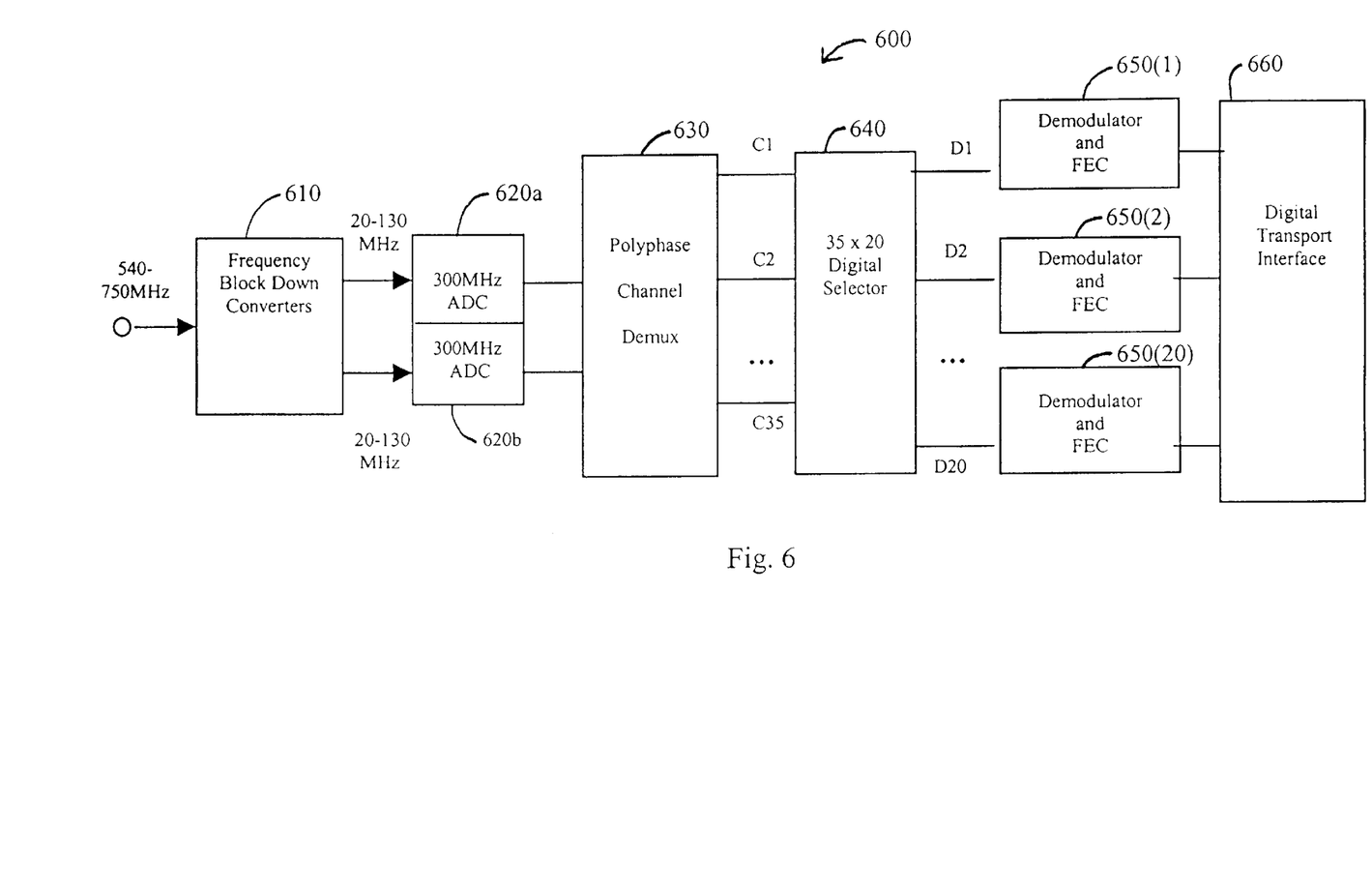
FIG. 6 is a simplified high-level block diagram of an exemplary multi-channel demodulator, according to another embodiment of the present invention.

FIG. 6 is a simplified high-level block diagram of an exemplary multi-channel demodulator 600 according to another embodiment of the present invention. Demodulator 600 is operates similarly to demodulator 200 of FIG. 2. In this specific embodiment, a frequency-block down-converter 610 receives a multi-channel analog RF signal. This signal can be sourced by a variety of systems such as satellite systems, terrestrial TV systems, cable systems, etc. In this specific embodiment, the signal is sourced by a cable system. Accordingly, the multi-channel analog RF signal is shown to be between 540–750 MHz. In other embodiments, the signal can be outside this range. As shown, the incoming RF signal is split into two signal groups, one in the range of 540–645 MHz and the other in the range of 645–750 MHz. Each group is down converted to a lower frequency band of 20–130 MHz so that the groups can be processed by respective 300-MHz ADCs 620a and 620b.

ADCs 620a and 620b convert the multi-channel analog RF signals to multi-channel digital RF signals. A demultiplexer 630 demultiplexes the multi-channel digital RF signal into separate digital RF channels $C_1$ to $C_n$. A single multi-channel RF signal can have multiple separate RF signals, e.g., 35 RF channels $C_1$ to $C_{35}$ per multi-channel RF signal. The exact number will depend on the specific application. A digital selector 640 digitally selects one or more RF channels $D_1$ to $D_m$ from the RF channels $C_1$ to $C_n$. A single separate RF channel can have multiple separate content signals, e.g., 18 content channels per RF channel. The exact number will depend on the specific application. For example, in FIG. 6, there are 35 separate RF channels $C_1$ to $C_{35}$. Of those RF channels, 20 RF channels $D_1$ to $D_{20}$ are selected. Those 20 selected RF channels are sent to a set of demodulators 650(1 . . . 20) for demodulation.

System Applications

Figure 7:
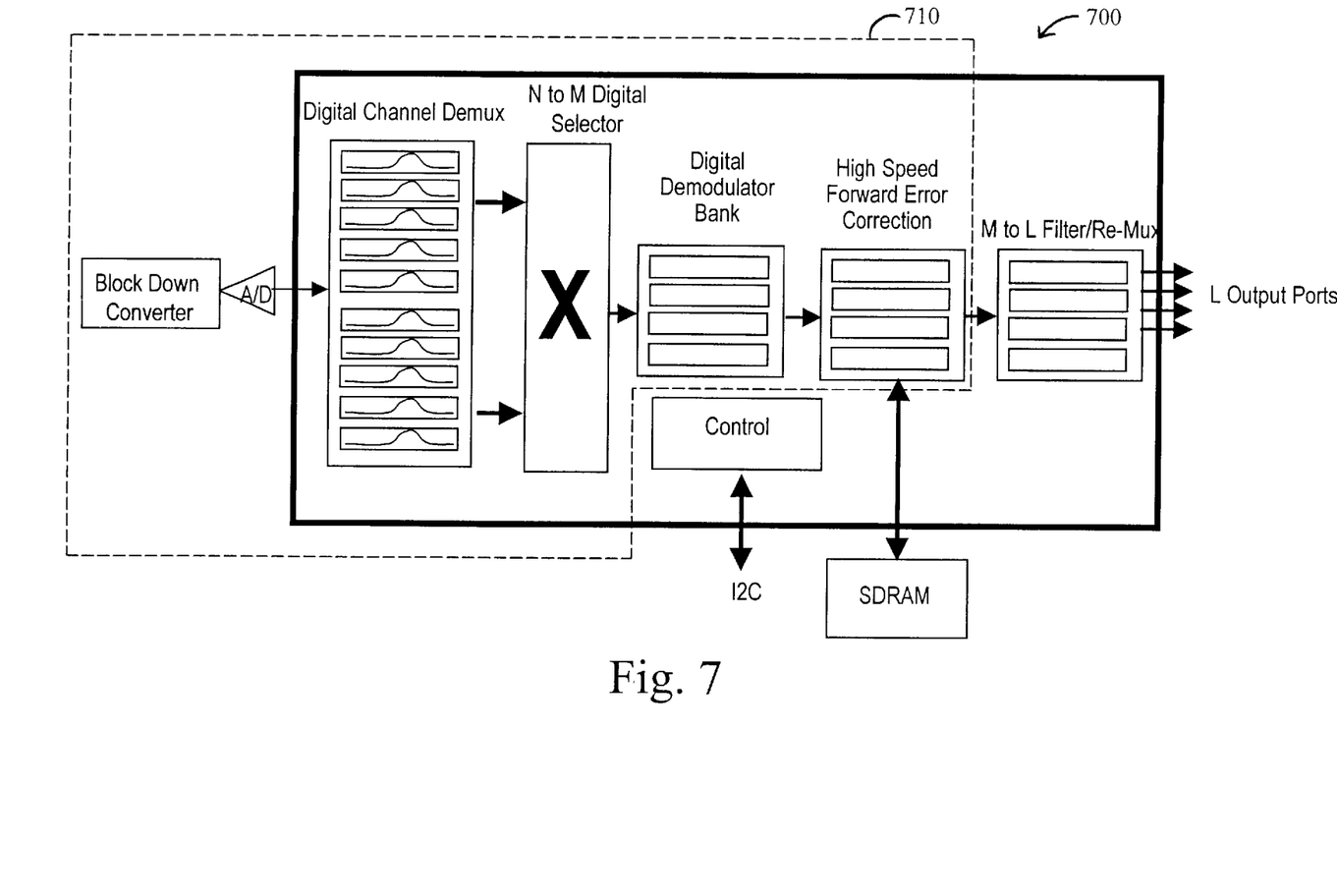
FIG. 7 is a simplified high-level block diagram of a system using an exemplary multi-channel demodulator, according to another embodiment of the present invention.

Embodiments of the present invention can be used in a variety of systems to provide cost-effective, reliable, and power-efficient solutions for home entertainment and information, such as delivering complex VLSI for high-performance video, audio and data content. Also, embodiments of the invention leverage the existing operator infrastructure while enabling new home networking architectures, new classes of consumer electronics devices, and new services. Embodiments of the invention can be used with system solutions using standard-process CMOS. FIG. 7 is a simplified high-level block diagram of a system 700 using a multi-channel demodulator 710, according to an embodiment of the present invention. The A/D converter shown on FIG. 7 can be on a chip embodying the invention or on a separate chip.

Figure 8:
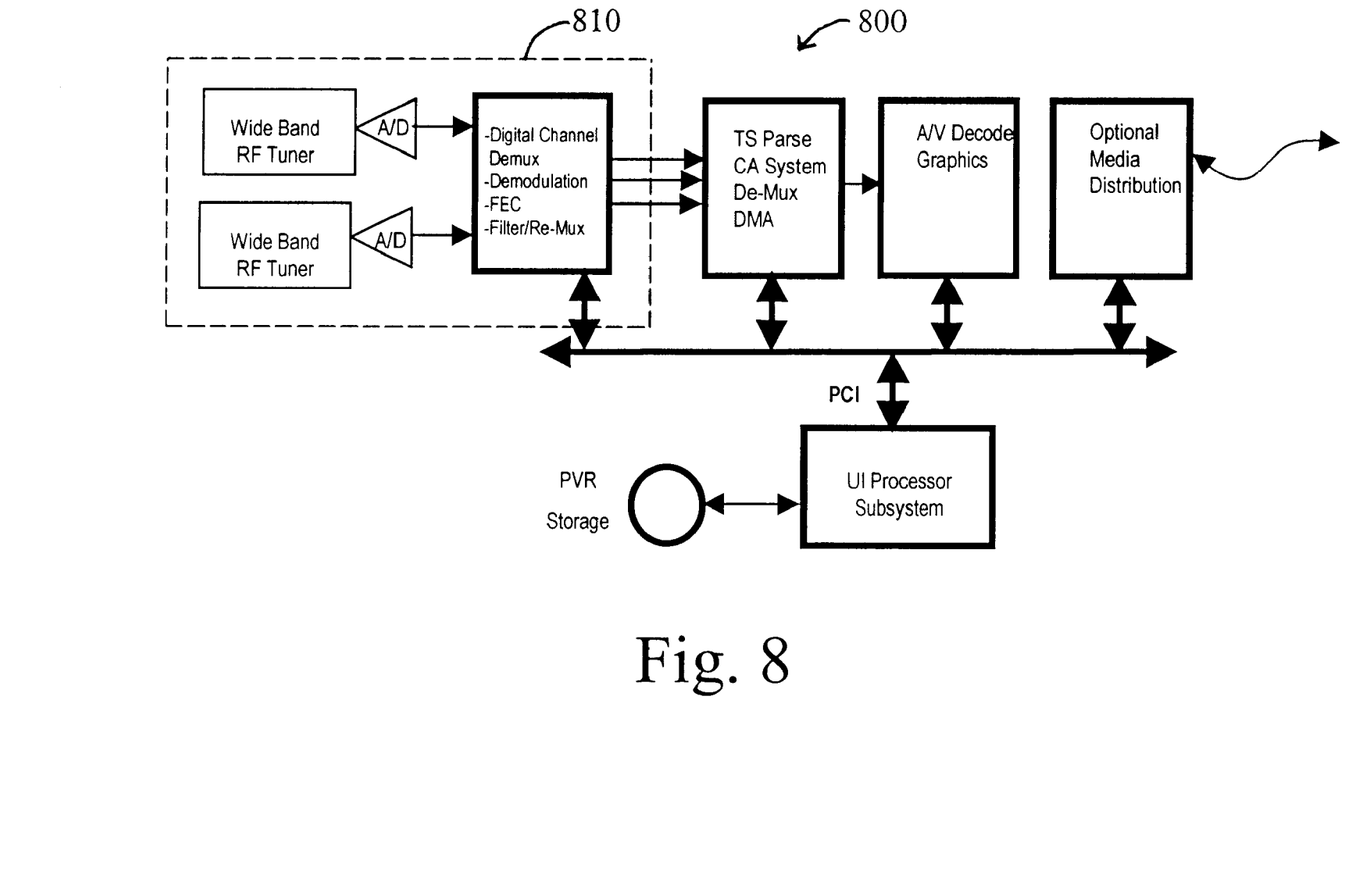
FIG. 8 is a simplified high-level block diagram of a system using an exemplary multi-channel demodulator, according to another embodiment of the present invention.

Systems using the invention are enabled to perform advanced wide-band front-ends for digital set-top boxes, PVRs, home gateways and home media centers. FIG. 8 is a simplified high-level block diagram of a system 800 using a multi-channel demodulator 810, according to an embodiment of the present invention. System 800 of FIG. 8 is a set-top box/PVR/home media server. Systems using the invention are also enabled to support the widest simultaneous reception of entertainment and information content while providing a wide-band return channel for 2-way communications in cable and satellite services.

Conclusion

In conclusion, it can be seen that embodiments of the present invention provide numerous advantages. Principally, embodiments of the invention eliminate the need for multiple downstream tuner/demodulator chipsets and multiple transport engines resulting in significantly reduced cost and power while delivering more than 10× performance and capacity. For satellite services, systems employing embodiments of the invention are able to receive an entire 500 MHz band without analog tuners and to support a DVB-RCS return channel. For cable services, a wide-band receiver using the invention can incorporate a DOCSIS return channel. Embodiments of the invention require only one or a small number of single-stage frequency-block down-converters instead of many RF tuners, which reduces overall system costs. Moreover, embodiments of the invention provide precise frequency spacing between channels, they share resources between different demodulators resulting in significant power savings. Moreover, the RF channel search through a digital selector is much faster than traditional analog channel switch through RF tuners. Moreover, the architecture can be utilized in both satellite and cable systems.

Specific embodiments of the present invention are presented above for purposes of illustration and description. The full description will enable others skilled in the art to best utilize and practice the invention in various embodiments and with various modifications suited to particular uses. After reading and understanding the present disclosure, many modifications, variations, alternatives, and equivalents will be apparent to a person skilled in the art and are intended to be within the scope of this invention. It is to be understood that the implementations of FIGS. 2–6 are merely examples and should not limit the scope of the claims herein. In light of the present invention, one of ordinary skill in the art would recognize many other variations, modifications, and alternatives. For example, the RF channels can be in different frequency bands. Also, the RF channels need not be contiguous. Also, the described circuits and methods can be implemented in a multitude of different forms (i.e., software, hardware such as CMOS, or a combination of both) in a variety of systems. Therefore, it is not intended to be exhaustive or to limit the invention to the specific embodiments described, but is intended to be accorded the widest scope consistent with the principles and novel features disclosed herein, and as defined by the following claims.

What is claimed is:

1. A digital multi-channel demodulator circuit for processing a multi-channel analog RF signal, the multi-channel demodulator comprising:
    a frequency-block down-converter configured to receive the analog RF signal and to shift the analog RF signal to a lower frequency band;
    an analog-to-digital converter (ADC) configured to receive the analog RF signal from the frequency-block down-converter and to convert the analog RF signal to a multi-channel digital RF signal;
    a digital channel demultiplexer configured to receive the digital RF signal from the ADC and to demultiplex the digital RF signal into separate digital RF channels;
    a selector configured to receive the separate digital RF channels and to select one or more separate digital RF channels; and
    one or more demodulators configured to receive one or more of the selected digital RF channels from the selector and to demodulate the one or more selected digital RF channels.

2. The circuit of claim 1 wherein each separate digital RF channel comprises one or more data streams to be accessed or used by a subscriber.

3. The circuit of claim 1 wherein the one or more demodulators demodulate only the RF channels that are selected by the selector.

4. The circuit of claim 1 further comprising a digital transport interface configured to receive the selected RF channels from the one or more demodulators and to output the selected RF channels.

5. The circuit of claim 1 further comprising a bandpass filter to reduce aliasing from unwanted signals.

6. The circuit of claim 1 wherein the ADC is a high-speed ADC.

7. The circuit of claim 1 wherein the ADC converts an entire signal band, the signal band including the multi-channel analog RF signal.

8. The circuit of claim 1 wherein the one or more demodulators share resources.

9. The circuit of claim 1 wherein the digital channel demultiplexer includes a digital tuner.

10. The circuit of claim 9 wherein the digital tuner comprises:
    a numeric control oscillator (NCO) configured to generate a select frequency, the select frequency being associated with a corresponding RF channel;
    a complex multiplier configured to receive the digital RF signal and to multiply the digital RF signal with the select frequency; and
    a low-pass filter (LPF) configured to receive the digital RF signal and to pass the corresponding RF channel.

11. The circuit of claim 10 wherein the LPF is a high-speed finite impulse response (FIR) filter.

12. The circuit of claim 1 wherein the digital multi-channel demodulator circuit processes downstream signals in at least one of a satellite system, a terrestrial TV system, and a cable system.

13. A system using the circuit of claim 1 in combination with memory.

14. A system using the circuit of claim 1 in combination with a processor.

15. The circuit of claim 1 wherein the digital channel demultiplexer is a polyphase channel demultiplexer.

16. The circuit of claim 16 wherein the polyphase channel demultiplexer comprises:
    one or more low-pass filters (LPF) configured to receive the multi-channel digital RF signal and to synchronize the RF channels;
    a discrete Fourier transform circuit (DFT) configured to receive the digital RF signal and to demultiplex the digital RF signal into separate RF channels.

17. The circuit of claim 16 wherein the DFT is a combination of different fast Fourier transforms.

18. The circuit of claim 16 wherein the polyphase channel demultiplexer comprises at least two LPFs, the coefficients of each LPF filter being a part of a bigger low-pass filter.

19. The circuit of claim 16 wherein the LPFs are low-speed finite impulse response (FIR) filters.

20. A method for demultiplexing a digital multi-channel RF signal into a plurality of separate content channels, the method comprising:
    down converting the multi-channel analog RF signal to a lower frequency band;
    converting the multi-channel analog RF signal into a multi-channel digital RF signal;
    demultiplexing the multi-channel digital RF signal into separate digital RF channels; and
    selecting one or more selected RF channels from at least one of the digital RF channels, each selected RF channel being an RF channel containing one or more content channels to be accessed or used by a subscriber.

21. The method of claim 20 further comprising receiving a plurality of multi-channel analog RF signals.

22. The method of claim 21 wherein the plurality of multi-channel analog RF signals can be from at least one of a satellite system, a terrestrial TV system, and a cable system.

23. The method of claim 20 further comprising demodulating the one or more selected RF channels.

24. The method of claim 23 further comprising demodulating only the one or more selected RF channels.

25. The method of claim 20 wherein the demultiplexing further comprises:

synchronizing samples of the multi-channel RF signal using LPFs; and shifting the frequencies of the RF channels.

26. A method for demultiplexing a digital multi-channel RF signal into a plurality of separate content channels, the method comprising:

down converting the multi-channel analog RF signal to a lower frequency band;

converting the multi-channel analog RF signal into a multi-channel digital RF signal; and demultiplexing the multi-channel digital RF signal into separate digital RF channels; the demultiplexing further comprising:

providing a plurality of select frequencies, each select frequency being associated with a corresponding and separate RF channel; and multiplying the at least one multi-channel RF signal with each of the select frequencies to obtain separate RF channels.

27. The method of claim 26 wherein the multiplying is achieved with a complex multiplier.

28. The method of claim 26 further comprising shifting the target RF channel to a baseband.

29. The method of claim 26 further comprising filtering undesired RF channels and passing only the target RF channel.

30. The method of claim 29 wherein the filtering is achieved with a low-pass filter (LPF).

31. The method of claim 30 wherein the LPF is a finite impulse response (FIR) filter.

32. The method of claim 31 wherein the FIR filter is a high-speed filter.

33. The method of claim 26 wherein the select frequencies are generated by numeric control oscillators.

* * * * *

UNITED STATES PATENT AND TRADEMARK OFFICE
CERTIFICATE OF CORRECTION

PATENT NO. : 6,704,372 B2
DATED : March 9, 2004
INVENTOR(S) : Weimin Zhang et al.

It is certified that error appears in the above-identified patent and that said Letters Patent is hereby corrected as shown below:

<u>Column 8,</u>
Line 38, kindly delete "16" and insert therefor -- 15 --

Signed and Sealed this

Thirteenth Day of July, 2004

JON W. DUDAS
*Acting Director of the United States Patent and Trademark Office*